US008086586B2

(12) United States Patent
Reynolds et al.

(10) Patent No.: US 8,086,586 B2
(45) Date of Patent: *Dec. 27, 2011

(54) ACCESSING A DATA STRUCTURE

(75) Inventors: Andrew David Reynolds, Southampton (GB); Martin James Rowe, Winchester (GB); Christopher Edward Sharp, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 12/337,609

(22) Filed: Dec. 17, 2008

(65) Prior Publication Data

US 2009/0100028 A1    Apr. 16, 2009

Related U.S. Application Data

(63) Continuation of application No. 11/002,547, filed on Dec. 2, 2004, now Pat. No. 7,478,082.

(30) Foreign Application Priority Data

Oct. 7, 2004 (GB) .................................. 0422294.9

(51) Int. Cl.
*G06F 17/30* (2006.01)
(52) U.S. Cl. ..................................................... 707/705

(58) Field of Classification Search ........... 707/705.781, 707/611, 626; 717/108; 719/328
See application file for complete search history.

(56) References Cited

U.S. PATENT DOCUMENTS

| 5,995,753 | A | 11/1999 | Walker |
| 6,125,369 | A | 9/2000 | Wu et al. |
| 6,430,564 | B1 | 8/2002 | Judge et al. |
| 6,477,527 | B2 | 11/2002 | Carey et al. |
| 6,826,759 | B2 | 11/2004 | Calder et al. |
| 7,089,560 | B1 * | 8/2006 | Uhler et al. .................... 719/311 |
| 7,162,476 | B1 * | 1/2007 | Belair et al. ............................ 1/1 |
| 2002/0065879 | A1 | 5/2002 | Ambrose et al. |
| 2003/0069890 | A1 * | 4/2003 | Benson et al. ............. 707/103 R |
| 2003/0208505 | A1 * | 11/2003 | Mullins et al. ................. 707/102 |
| 2004/0163020 | A1 | 8/2004 | Sidman |

* cited by examiner

*Primary Examiner* — Hung T Vy
(74) *Attorney, Agent, or Firm* — Yee & Associates, P.C.; David A. Mims, Jr.

(57) ABSTRACT

There is disclosed a method, apparatus, computer program and computer program product for facilitating access by an application to a data structure comprising a plurality of objects. A request is received from the application which initiates the return of the data structure. A handle is assigned to each of at least some of the plurality of objects. Objects in the data structure are retrieved and the application is informed of assigned handles thereby enabling the application to access retrieved objects.

5 Claims, 2 Drawing Sheets

ACCESSING A DATA STRUCTURE

This application is a continuation of application Ser. No. 11/002,547, filed Dec. 2, 2004, status, allowed.

FIELD OF THE INVENTION

The invention relates to asynchronous application programming interfaces (APIs) and more particularly to the return of objects from a call to such an API.

BACKGROUND OF THE INVENTION

As will be familiar to those skilled in the art of programming, a program often comprises function calls which provide a return value(s) for subsequent use in the program. A synchronous program will typically wait for a function to return any values before continuing with its processing. Certain environments however cannot afford such waiting—they require almost instantaneous results. In for example a gaming environment, users are typically not prepared to wait 5 seconds whilst a screen updates. Good performance is required and yet games applications typically use a non-threaded model of programming thus preventing the use of parallel processing to achieve required performance levels. (This is because threads are typically under the control of the operating system and so do not therefore permit tight enough control by the games application programmer.)

To help achieve acceptable performance levels, asynchronous APIs and handles are often used. A handle is an abstract reference (label) which is associated with a function's return value and which can then be used to access that return value.

For example, a user program (application) may call function y on some API which may need to return value r. The time taken to process the request and actually return the value r may however be too long, and will have too large an impact on the user program. Instead, when the function is called, it returns a handle "handle_r", which is an abstract reference to the actual return value, r, which will initially be unavailable. The work of actually processing the request made as a result of that function, and thus retrieving r, will not be immediately carried out. Instead, the user program will later provide the API with x milliseconds in which to actually do that work, and to obtain the return value r. Once the API's allotted time slot has expired, the user program will then query handle_r to determine whether it resolves to the return value r. If the answer is no, then the user application may do some additional processing, such as redrawing a screen, before requesting that the API re-attempt to obtain r and also before handle_r is queried again. The user application can periodically query the handle (interspersing this with additional processing) until handle_r finally resolves to the result r. Note, when r is finally returned from function y, it is stored in a block of memory and an entry in a lookup table is then resolved such that "handle_r" references the block of memory containing r. This time, when the user program queries handle_r, it is presented with access to r. Because the user application only provides the API with a short period of time in which to retrieve the object, the delay whilst this is happening is not discernible to a user.

In reality (given a good network connection) the return of a single value (simple object) should be achieved within the x milliseconds allowed for. Sometimes however API calls return more complex data structures. For example, a call may return a linked list of items, or a tree of items. Complex data structures are composed of many individual objects. These objects are then linked to each other via the use of object pointers, and the complex data structure is created as a result of this linkage.

When using asynchronous APIs, a function is not able to immediately return a result. Rather, a handle is returned instead. This handle is associated with an eventual return value (i.e. complex structure) generated by the asynchronous API (this value being the result of the initial function call). The user is informed of the return of this result and the association with the handle via a change in the handle's "state" (e.g. it moves from an "Empty" to a "Complete" state). The user then uses the handle to access the return value. As far as the user is concerned, the handle is not resolvable (i.e. is in the "Empty" state) until the structure is complete. The program need however not be blocked since as before it may provide the API with x milliseconds to retrieve n objects. During that time, the API may retrieve only 2 of those objects. These will be associated with a handle but to the user this handle does not yet resolve to a structure because all objects in the structure have not yet been retrieved. The program will continue its processing, will periodically request that the API retrieves more objects and will query the handle to determine whether it is resolvable. This can however take time (especially where network connections are involved and when large structures need to be retrieved) and this can be undesirable.

SUMMARY OF THE INVENTION

According to a first aspect the invention provides a method for facilitating access by an application to a data structure comprising a plurality of objects, the method comprising the steps of: receiving a request from the application initiating the return of the data structure; assigning a handle to each of at least some of the plurality of objects; retrieving objects in the data structure; informing the application of assigned handles thereby enabling the application to access retrieved objects.

Note, no order is intended to be implied by the above. For example, objects could be retrieved and then handles assigned or handles could be assigned and then resolved as and when the associated objects are retrieved.

Note, objects may be retrieved via an intermediary.

Previously a requesting application had to wait for the entire data structure (and the objects it contained) to be returned before objects in the data structure could be accessed. With the present solution it is now possible to provide access to individual objects in a data structure as and when such objects are retrieved. This enables an application to work with retrieved objects whilst other objects are being retrieved/in an interim before more objects in the data structure are retrieved.

In a preferred embodiment, the request comprises a function call which is operable to return the data structure to the application.

In a preferred embodiment responsive to retrieving an object, the retrieved object is assigned to a memory location and a handle is associated with the memory location containing that object. A lookup table can be used to associate each handle with an object/with a memory location containing an object.

In one embodiment, more than one object may be stored in the same block of memory and consequently one handle may be used to reference any objects stored within a particular memory block (logically the block of memory becomes one object).

In a preferred embodiment a request is received from the application to access a retrieved object. The request preferably uses the handle associated with the retrieved object. Preferably access is then provided to the requested object (even though all objects in the data structure may not have yet been retrieved).

In a preferred embodiment, a request may be received to free up a memory location associated with a retrieved object. The memory location is then freed—for example, the memory location is permitted to be overwritten with new data. This is particularly advantageous in the situation where there is not enough memory available to accommodate the complete data structure. The application may determine that certain of the retrieved objects are not required and may then request that any memory allocated to these objects is freed up. Such freed memory can then be used for other objects in the data structure.

According to a second aspect, the invention provides a method for accessing objects in a data structure comprising: providing a request to an asynchronous application programming interface initiating the return of a data structure; receiving notification of a handle assigned to an object in the data structure; and using the notified handle to access the corresponding object.

Note, the same handle may be assigned to more than one object—see above.

Preferably, it is necessary to periodically query the handle to determine whether it is resolvable to a retrieved object.

Preferably the request is a function call which is operable to return the data structure.

Preferably it is possible to access an object in the data structure using an assigned handle. Further, it is preferably possible to use an accessed object to determine the handle assigned to another object in the data structure. For example, a handle to the next object in the data structure (e.g. where the data structure is a linked list) may be stored with the accessed object.

According to a preferred embodiment, it is possible to determine that an accessed object is no longer required. Responsive to determining that the accessed object is no longer required, it is preferably possible to request that memory associated with the accessed object is freed. This is useful since certain objects may not be required by the application (or may only temporarily be required). Memory is frequently at a premium and so it is extremely advantageous to be able to free up memory containing objects that are no longer being accessed.

Note, this is applicable to an implementation which provides for a "non-destructive" read—i.e. where the object remains stored in memory associated with the API, even after it is accessed, and is only destroyed when a function call explicitly freeing up that handle is made.

In another embodiment, destructive reads are provided for—i.e. when a handle is used to retrieve an object for an application, the memory associated with that object is freed, therefore meaning that version of the object that the application now holds is the only one that exists. This also therefore means that that handle cannot be referenced again.

According to a third aspect, the invention provides apparatus for facilitating access by an application to a data structure comprising a plurality of objects, the apparatus comprising: means for receiving a request from the application initiating the return of the data structure; means for assigning a handle to each of at least some of the plurality of objects; means for retrieving objects in the data structure; means for informing the application of assigned handles thereby enabling the application to access retrieved objects.

According to a fourth aspect, the invention provides apparatus for accessing objects in a data structure comprising: means for providing a request to an asynchronous application programming interface initiating the return of a data structure; means for receiving notification of a handle assigned to an object in the data structure; and means for using the notified handle to access the corresponding object.

According to a fifth aspect, the invention provides a computer program comprising program code means adapted to perform the method of the first or second aspect when said program is run on a computer.

According to a sixth aspect, the invention provides a computer program product stored on a computer readable storage medium, the computer program product comprising instructions which, when executed on a data processing host, cause said host to carry out the method of the first or second aspect.

BRIEF DESCRIPTION OF THE DRAWINGS

A preferred embodiment of the present invention will now be described, by way of example only, and with reference to the following drawings.

DETAILED DESCRIPTION

Figure 1:
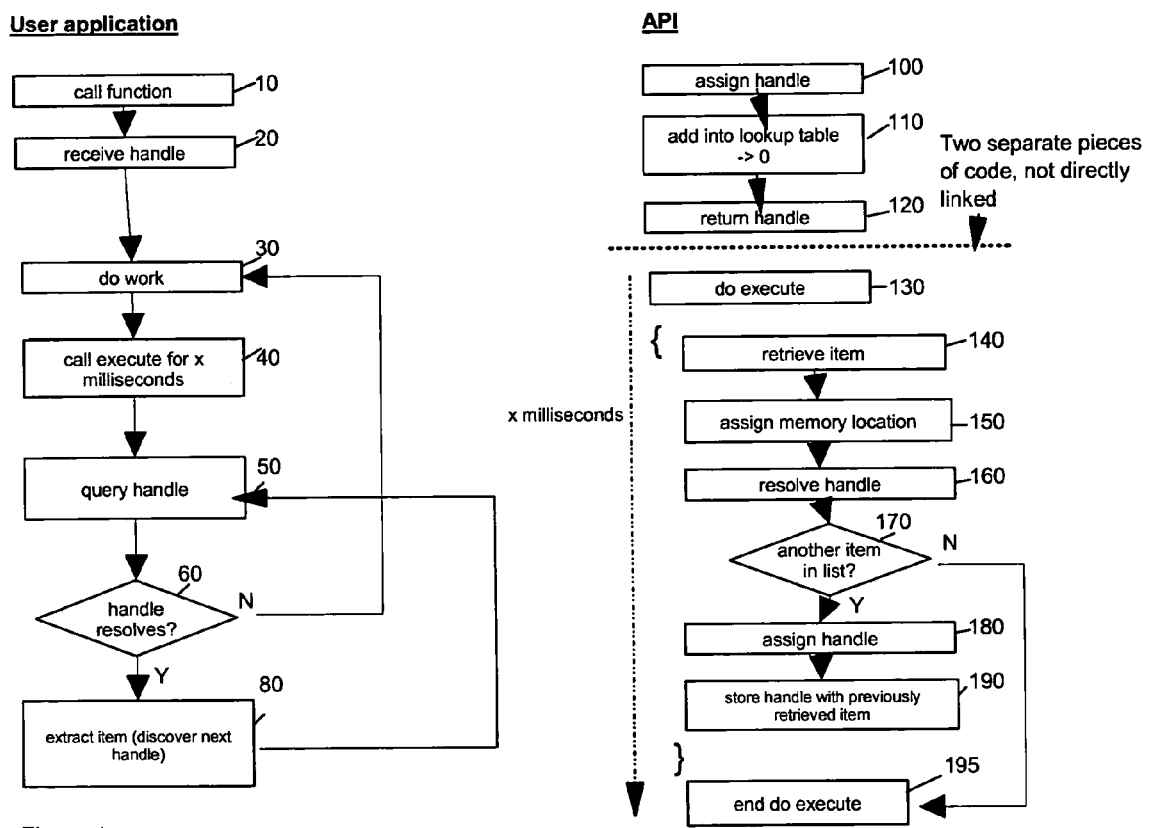
FIG. 1 is a flow chart showing the processing of the present invention in accordance with a preferred embodiment.
Figure 2:
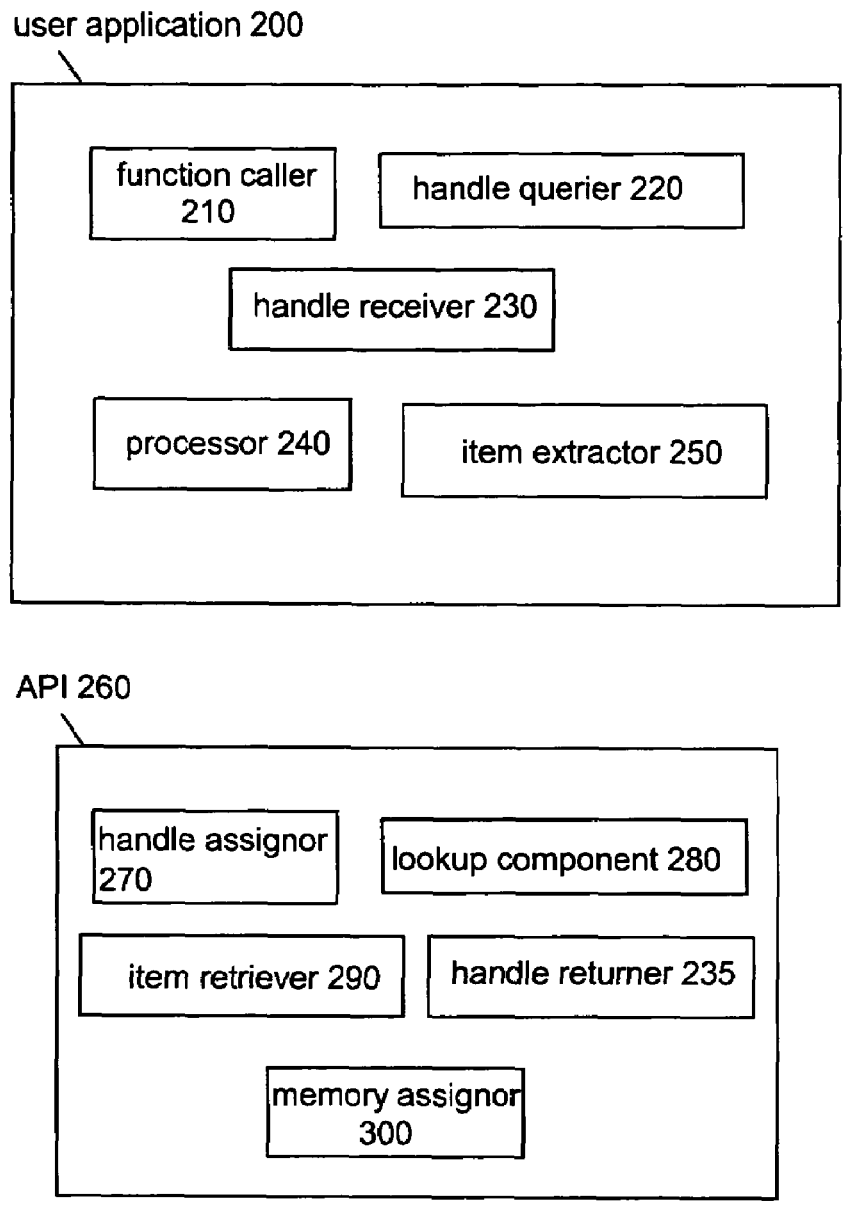
FIG. 2 illustrates a component diagram in accordance with a preferred embodiment of the present invention.

The figures shows the processing of the present invention, in accordance with a preferred embodiment, from the perspective of both an application (e.g. a user application) and an asynchronous application programming interface (API). Both figures should be read in conjunction with one another.

A user application 200 calls a function at step 10 (via the function caller component 210) which will eventually return a complex structure comprising a plurality of objects. For example the user application may be commerce-based, and will thus enable a user to move around a virtual store and query a catalogue of items stocked by the store. The structure returned by a function may, for example, be a subset of items within the catalogue (a linked list in this case, although the invention is not limited to such).

When the API 260 receives the function call, it determines that the function returns a complex structure and assigns a handle at step 100 (handle assignor 270) to the first item in the structure. The API adds the handle into a lookup table (step 110—lookup component 280). The handle resolves to nothing at this point. This handle is then returned to (step 120—handle returner 235) and received by the user application (step 20—handle receiver 230).

The user application does some work (processing—step 30—processor 240) such as drawing the virtual store. It then calls an execute function at step 40 (function caller—210) and allocates x milliseconds to the API for performing this execute function (shown by the dotted arrow). The execute function is performed by the API (step 130) and enables the API to carry out any pending work. (Note, the dotted line indicates that steps 120 and 130 are not directly linked.)

When the execute function is called by the user application, the API attempts to retrieve the first item in the list (step 140—item retriever 290). Note, this can take some time, especially if network connections etc. are involved.

When an item is retrieved, it is assigned to a memory location (step 150—memory assignor 300). This memory location is then associated with the handle such that the handle now resolves (step 160).

Some other information, which is not exposed to the user application, is used by the API to determine whether there is another item in the list (step 170). For example, the API may retrieve information by which it is informed that this is item 20 of 25. The API then manipulates the data retrieved into a form which the user application can understand. E.g.:

```
item
{
string name;
int cost;
handle next;
}
```

If there is another item, then a handle is also assigned to the "next" field of the retrieved item (step 180—handle assignor 270). Thus a handle is stored in memory with this item (step 190 handle assignor 270). (Note, if there isn't another item, then the next field may be assigned a null value or alternatively there may not be such a field.) The handle is also added into the lookup table.

Note, one embodiment handles may be stored separately but this is preferably only applicable to a linked list embodiment where traversing the list in order is not important.

The execute function continues until the allotted time period expires (step 195)—control is then returned to the user application at step 50. More than one item may be retrieved during the allotted time period.

Further note, the time period is chosen so that the wait caused to the user application, whilst the API is executing, is not discernible to the user.

When control is returned by the API to the user application, the user application queries the returned handle to determine whether the handle resolves to an object (steps 50, 6—handle querier 220). If the API has managed to retrieve the associated object, the user application will receive an indication that the handle now resolves—not shown in the figure. The user application will then use the assigned handle to access and extract the retrieved item (step 80—item extractor 250). Note, this may involve accessing the object remotely or actually retrieving the object and storing it locally.

As previously mentioned, there may be more items in the list. The user application is able to determine the handle to the next item because it is stored with the item that has just been received. This handle is then preferably used to immediately query whether the new handle resolves (i.e. whether the item associated with the handle has yet been retrieved and assigned to a memory location). This is because the execute function may have managed to retrieve more than one item in the x milliseconds allotted to it.

If the answer is yes, then the handle is used to access this next item and same process continues until it is determined that a handle does not resolve.

Otherwise the user application does some more work before it once again calls the execute function (step 30—function caller 210).

In this way, it is possible to gain access to the individual items (objects) in a complex structure. It is no longer necessary to wait for the entire structure to be returned before permitting the user access to the items (objects) within the structure. Rather the user can now see and work with items as and when they are returned by the API. This is advantageous in multiple respects. Allowing a user to work with certain items whilst others are being returned saves time. Further it is useful in situations where it is not possible to allocate enough memory to an entire structure. Memory can be allocated to objects, consumed by a user application and then destroyed when no longer required. Destruction frees up memory for the rest of the structure. For example, the user may not be interested in "shoes" and is thus able to overwrite memory allocated to any returned items which relate to such items.

Note, handles do not have to be queried immediately control is returned to the user application. Further objects which resolve to queried handles do not have to be retrieved immediately.

It will be appreciated that whilst the invention has been described in terms of a data structure comprising a linked list, the invention is not limited to such. For example, the data structure may comprise a tree of nodes. To use a binary tree as an example, the root object in the tree would be the first item that would be returned from the API. Each of the two child objects of that root object (since this is a binary tree) would then have handles associated with them.

Regarding which of the child objects is returned first, this would partly depend on the API and partly on the source that the object is being retrieved from (e.g. from a commerce service, across the network—certain objects may be retrieved quicker than others because of a better network connection etc.). The API would have to build up its own internal representation of the tree and correctly link all those handles, as and when they're returned. The user of the API would then traverse the tree by just accessing each child (and therefore traversing each branch of the tree) as and when the handles for those child resolve into a state that indicates that the object is now available to be retrieved.

The preferred embodiment assumes that when an object is retrieved, it is retrieved in its entirety. This object retrieval can be subdivided into two steps: receipt of the data that represents the object and parsing of that data to provide the actual object. In some embodiments the parsing of the data can be very expensive. Those embodiments can be further improved by avoiding the parsing step for those objects which the requesting user application does not access. This is achieved by delaying the parsing step until the requesting user application actually accesses the handle associated with the requested object.

What is claimed is:

1. An apparatus for facilitating access by an application to a data structure comprising a plurality of objects, the apparatus comprising:
a processor operating in conjunction with a memory;
means for receiving from the application a request initiating return of the data structure, and wherein the means for receiving is configured to resolve the data structure;
means for assigning a corresponding handle to each of a set of objects selected from the plurality of objects, and wherein at least one of the set comprises an unresolved object having an unresolved handle, wherein the unresolved handle indicates that the unresolved object is unresolved;
means for retrieving a resolved object from the set of corresponding resolved handles to reference the resolved object, wherein the unresolved object of the data structure remains in the data structure and remains unresolved;
means for storing the resolved object;
means for providing the resolved object to the application before the data structure is resolved;
means for storing a second handle assigned to another object in the data structure with a previously retrieved object;

means for determining the second handle assigned to the another object, responsive to the application accessing the previously retrieved object;

means for selecting a third object from the data structure, responsive to the second handle indicating that the another object is unresolved.

2. The apparatus of claim 1, wherein the request comprises a function call that returns the data structure to the application.

3. The apparatus of claim 1 comprising:

means for receiving a request to free up a memory location associated with a retrieved object; and means for freeing up the memory location associated with the retrieved object.

4. The apparatus of claim 1 further comprising:

means for resolving the data structure; and means for returning the data structure to the application.

5. The apparatus of claim 1 further comprising:

means for determining whether the unresolved handle becomes resolved after waiting for a predetermined time;

means for extracting the resolved item responsive to the unresolved handle becoming unresolved; and means for continuing processing of the application, responsive to determining that the unresolved handle remains unresolved.

* * * * *